(12) United States Patent
Kumar et al.

(10) Patent No.: US 10,708,923 B2
(45) Date of Patent: Jul. 7, 2020

(54) METHOD AND/OR SYSTEM FOR REDUCING UPLINK INTERFERENCE

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/692,573

(22) Filed: Aug. 31, 2017

(65) Prior Publication Data

US 2019/0069302 A1 Feb. 28, 2019

(51) Int. Cl.
| | |
|---|---|
| H04W 72/08 | (2009.01) |
| H04W 72/04 | (2009.01) |
| H04W 4/02 | (2018.01) |
| H04L 5/00 | (2006.01) |
| H04W 72/12 | (2009.01) |
| H04W 76/28 | (2018.01) |
| H04B 15/04 | (2006.01) |
| H04B 15/06 | (2006.01) |
| H04B 15/00 | (2006.01) |

(52) U.S. Cl.
CPC .......... *H04W 72/082* (2013.01); *H04B 15/00* (2013.01); *H04B 15/04* (2013.01); *H04B 15/06* (2013.01); *H04L 5/0053* (2013.01); *H04L 5/0057* (2013.01); *H04W 4/02* (2013.01); *H04W 72/0406* (2013.01); *H04W 72/12* (2013.01); *H04W 76/28* (2018.02); *H04L 5/001* (2013.01); *H04L 5/0048* (2013.01); *H04L 5/0098* (2013.01); *H04W 72/1268* (2013.01)

(58) Field of Classification Search
CPC .................................................. H04W 72/082
USPC ........................................................ 370/280
See application file for complete search history.

(56) References Cited

U.S. PATENT DOCUMENTS

| | | | |
|---|---|---|---|
| 8,526,388 B1 * | 9/2013 | Kaukovuori ........ | H04W 72/082 370/329 |
| 8,838,046 B2 * | 9/2014 | Fu .......................... | H04B 1/406 455/67.13 |
| 2013/0250871 A1 | 9/2013 | Kaukovuori et al. | |
| 2013/0315157 A1 | 11/2013 | Krishnamurthy et al. | |
| 2014/0071904 A1 | 3/2014 | Koo et al. | |
| 2015/0078483 A1 | 3/2015 | Sun et al. | |
| 2015/0092563 A1 | 4/2015 | Tabet et al. | |
| 2015/0215947 A1 * | 7/2015 | Kaukovuori ........ | H04W 72/082 370/329 |
| 2016/0164557 A1 * | 6/2016 | Li ........................ | H04B 1/1036 455/307 |
| 2017/0318587 A1 * | 11/2017 | Lim ....................... | H04L 5/001 |
| 2018/0131398 A1 * | 5/2018 | Shiu ....................... | H04B 15/06 |
| 2019/0007923 A1 * | 1/2019 | Blankenship ......... | H04W 28/20 |

* cited by examiner

*Primary Examiner* — Kodzovi Acolatse
*Assistant Examiner* — Abdeltif Ajid
(74) *Attorney, Agent, or Firm* — Hunter Clark PLLC

(57) ABSTRACT

Methods and systems are disclosed for concurrent transmission of resource blocks allocated to a mobile device for transmission in uplink communication channels. In particular implementations, a mobile device may tune local oscillators and/or apply filtering of radio frequency transmission to reduce or mitigate intermodulation distortion potentially affecting one or more radio frequency receiving functions.

26 Claims, 9 Drawing Sheets

METHOD AND/OR SYSTEM FOR REDUCING UPLINK INTERFERENCE

BACKGROUND

Field

Subject matter disclosed herein relates to estimation of a location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). In particular implementations, a mobile device may transmit and receive messages on LTE links while performing other radio frequency receiving functions such as processing satellite positioning system (SPS) signals and processing received Bluetooth® communications.

SUMMARY

Briefly, one particular implementation is directed to a method at a mobile device comprising: a method, at a mobile device, comprising: scheduling transmission of one or more first allocated resource blocks in a first carrier of a first uplink communication channel; scheduling transmission of one or more second allocated resource blocks in a second carrier of a second uplink communication channel, at least a portion of the one or more second allocated resource blocks to be transmitted concurrently with transmission of at least a portion of the one or more allocated first resource blocks; and in response to a determination that concurrent transmission in the first and second carrier likely interferes with a radio frequency (RF) receiving function, tuning a first oscillator for transmission of the one or more first allocated resource blocks to a frequency within the one or more first allocated resource blocks; and tuning a second oscillator for transmission of the one or more second allocated resource blocks within the one or more second allocated resource blocks.

Another particular implementation is directed to a mobile device, comprising: means for scheduling transmission of one or more first allocated resource blocks in a first carrier of a first uplink communication channel; means for scheduling transmission of one or more second allocated resource blocks in a second carrier of a second uplink communication channel, at least a portion of the one or more second allocated resource blocks to be transmitted concurrently with transmission of at least a portion of the one or more allocated first resource blocks; and in response to a determination that concurrent transmission in the first and second carrier likely interferes with a radio frequency (RF) receiving function, means for tuning a first oscillator for transmission of the one or more first allocated resource blocks to a frequency within the one or more first allocated resource blocks; and means for tuning a second oscillator for transmission of the one or more second allocated resource blocks within the one or more second allocated resource blocks.

Another particular implementation is directed to a mobile device, comprising: a transmitter for transmitting messages in uplink communication channels; and one or more processors configured to: schedule transmission of one or more first allocated resource blocks through the transmitter in a first carrier of a first uplink communication channel; schedule transmission of one or more second allocated resource blocks through the transmitter in a second carrier of a second uplink communication channel, at least a portion of the one or more second allocated resource blocks to be transmitted concurrently with transmission of at least a portion of the one or more allocated first resource blocks; and in response to a determination that concurrent transmission in the first and second carrier likely interferes with a radio frequency (RF) receiving function, tune a first oscillator at the transmitter for transmission of the one or more first allocated resource blocks to a frequency within the one or more first allocated resource blocks; and tune a second oscillator at the transmitter for transmission of the one or more second allocated resource blocks within the one or more second allocated resource blocks.

Another particular implementation is directed to a storage medium comprising computer readable instructions stored thereon which are executable by one or more processors of a mobile device to: schedule transmission of one or more first allocated resource blocks in a first carrier of a first uplink communication channel; schedule transmission of one or more second allocated resource blocks in a second carrier of a second uplink communication channel, at least a portion of the one or more second allocated resource blocks to be transmitted concurrently with transmission of at least a portion of the one or more allocated first resource blocks; and in response to a determination that concurrent transmission in the first and second carrier likely interferes with a radio frequency (RF) receiving function, tune a first oscillator for transmission of the one or more first allocated resource blocks to a frequency within the one or more first allocated resource blocks; and tune a second oscillator for transmission of the one or more second allocated resource blocks within the one or more second allocated resource blocks.

Another particular implementation is directed to a method, at a mobile device, comprising: scheduling transmission of one or more first allocated resource blocks in a first carrier of a first uplink communication channel; scheduling transmission of one or more second allocated resource blocks in a second carrier of a second uplink communication channel, at least a portion of the one or more second resource blocks to be transmitted concurrently with transmission of at least a portion of the one or more first resource blocks; an in response to a determination that concurrent transmission in the first and second carrier likely interferes with a radio frequency (RF) receiving function, tuning an oscillator for transmission of the one or more allocated first resource blocks and the one or more allocated second resource blocks to a frequency approximately bisecting a highest frequency of the one or more first resource blocks and a lowest frequency of the one or more second resource blocks.

Another particular implementation is directed to a method, at a mobile device, comprising: one or more transmitter devices; and one or more processors configured to: schedule transmission of one or more first allocated resource blocks through the one or more transmitter devices in a first carrier of a first uplink communication channel; schedule transmission of one or more second allocated resource blocks through the one or more transmitter devices in a second carrier of a second uplink communication channel, at least a portion of the one or more second resource blocks to be transmitted concurrently with transmission of at least a portion of the one or more first resource blocks; and in response to a determination that concurrent transmission in the first and second carrier likely interferes with a radio frequency (RF) receiving function, tune an oscillator for transmission through the one or more transmitter devices of the one or more allocated first resource blocks and the one or more allocated second resource blocks to a frequency approximately bisecting a highest frequency of the one or more first resource blocks and a lowest frequency of the one or more second resource blocks.

Another particular implementation is directed to a non-transitory storage medium comprising computer-readable instructions stored thereon which are executable by a processor of a mobile to: schedule transmission of one or more first allocated resource blocks in a first carrier of a first uplink communication channel; schedule transmission of one or more second allocated resource blocks in a second carrier of a second uplink communication channel, at least a portion of the one or more second resource blocks to be transmitted concurrently with transmission of at least a portion of the one or more first resource blocks; and in response to a determination that concurrent transmission in the first and second carrier likely interferes with a radio frequency (RF) receiving function, tune an oscillator for transmission of the one or more allocated first resource blocks and the one or more allocated second resource blocks to a frequency approximately bisecting a highest frequency of the one or more first resource blocks and a lowest frequency of the one or more second resource blocks.

Another particular implementation is directed to a mobile device, comprising: means for scheduling transmission of one or more first allocated resource blocks in a first carrier of a first uplink communication channel; means for scheduling transmission of one or more second allocated resource blocks in a second carrier of a second uplink communication channel, at least a portion of the one or more second resource blocks to be transmitted concurrently with transmission of at least a portion of the one or more first resource blocks; and means for tuning an oscillator for transmission of the one or more allocated first resource blocks and the one or more allocated second resource blocks to a frequency approximately bisecting a highest frequency of the one or more first resource blocks and a lowest frequency of the one or more second resource blocks in response to a determination that concurrent transmission in the first and second carrier likely interferes with a radio frequency (RF) receiving function.

It should be understood that the aforementioned implementations are merely example implementations, and that claimed subject matter is not necessarily limited to any particular aspect of these example implementations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
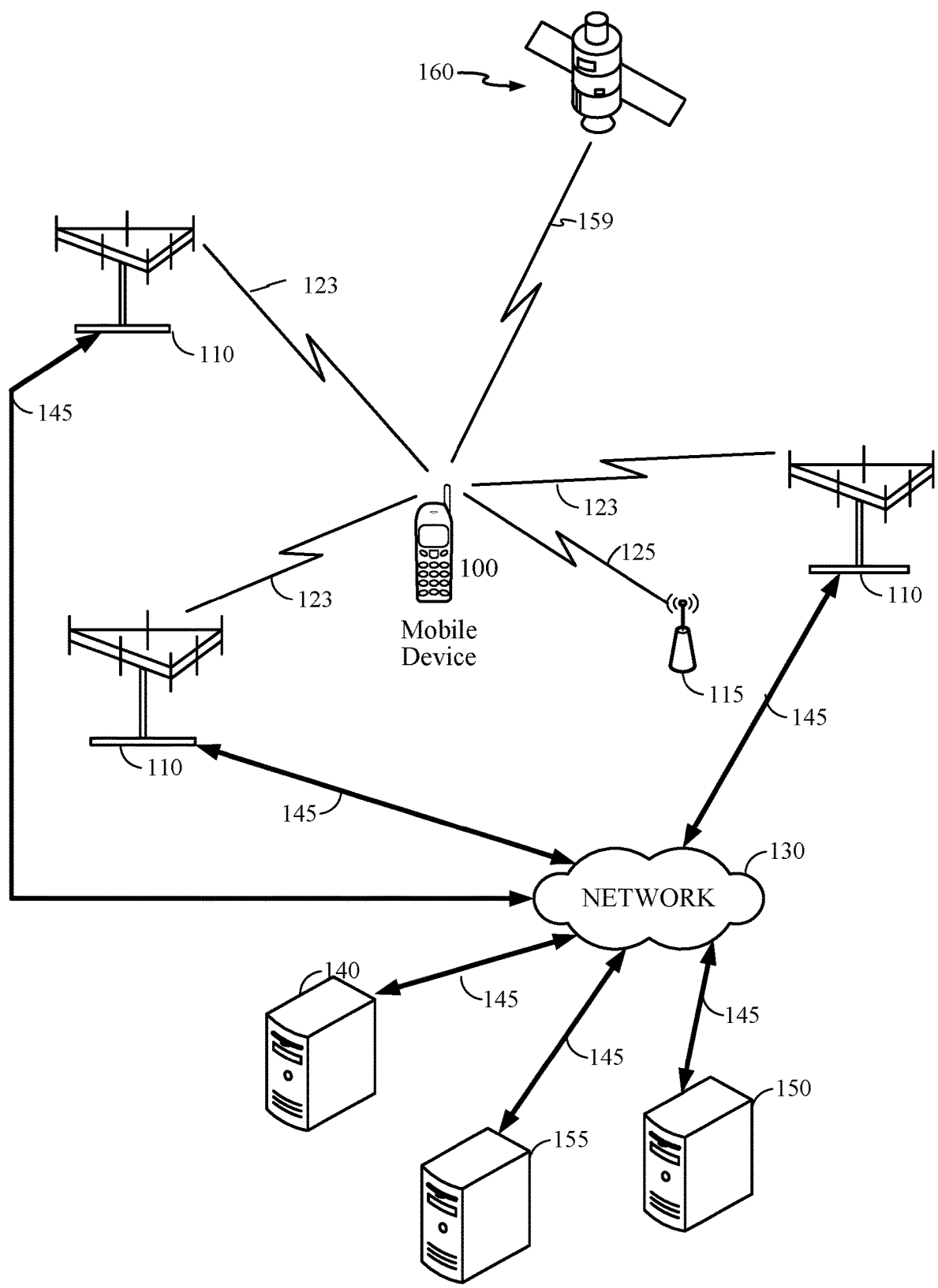
FIG. 1 is an example architecture for terrestrial positioning.

Reference is made in the following detailed description to accompanying drawings, which form a part hereof, wherein like numerals may designate like parts throughout that are identical, similar and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

According to an embodiment, a carrier operator deploying a Long-term Evolution (LTE) network may be required by regulators to provide an E911 service capable of furnishing estimated locations of mobile devices to emergency responders. The estimated locations may be obtained, at least in part, from observations of signals transmitted by a global navigation satellite system (GNSS) or observations of a positioning reference signal (PRS). A mobile device typically obtains observations for use in estimating a location of the mobile device using one or more radio frequency (RF) functions (e.g., using an RF receiver). A mobile device may employ other RF functions such as, for example, a Bluetooth® receiver enabling a wireless earpiece, for example.

An LTE network may enable a mobile device to communicate on any one of several uplink communication channels to one or more base stations. Particular available uplink communication channels, however, may interfere with or jam one or more other RF functions such as, for example, RF functions to receive and process GNSS signals or Bluetooth® signals. Additionally, uplink carrier aggregation (ULCA) may enable a mobile device to transmit messages in different communication channels. According to an embodiment, an uplink communication channel to a base station may be defined according to parameters characterizing an allocation spectrum resources comprising a "carrier." ULCA may be implemented to concurrently transmit in multiple channels of a single carrier ("intra-band" ULCA) of a carrier or in multiple channels in different carriers ("inter-band" ULCA) of different carriers. In an embodiment, an uplink communication channel of a carrier may comprise an allocated portion of a spectrum in a transmission medium referred to herein as a "carrier band" or "carrier bandwidth" (where "carrier band" and "carrier bandwidth" are used interchangeably herein). In an implementation, a "resource block" (RB), as referred to herein, means a defined portion of a transmission band (e.g., a portion of a carrier bandwidth of a particular uplink communication channel) over a defined duration. In a particular implementation, a mobile device may determine uplink RBs allocated to the mobile device by decoding a PDCCH symbol received in a downlink signal. In practice, a network may allocate uplink RBs over a small portion of an entire carrier bandwidth of an uplink communication channel.

In particular scenarios, various ULCA channel transmission combinations exhibit intermodulation distortion (IMD) which may desense certain RF receiving functions such as SPS signal processing, WiFi and/or Bluetooth. For example, letting the center frequency of two uplink carrier bandwidths be $Flo_1$ and $Flo_2$, if subcarrier signals having frequencies $F_{c1}$ and $F_{c2}$ interfere with an RF receiving function, these subcarrier signals may introduce intermodulation distortion (IMD) components 'a' and 'b' to provide an IMD spectral function falling in band of a particular RF receiving function (e.g., SPS signal processing, Wi-Fi or Bluetooth) according to expression (1) as follows:

$$a \times F_{c1} + b \times F_{c2}, \quad (1)$$

where:
a and b can be both positive and negative coefficients and |a+b| defines an order of IMD.

According to an embodiment, a local oscillator frequency may be changed to affect a center frequency and bandwidth of operation based on an allocation of uplink RBs. In an implementation, local oscillators for transmitting in an uplink communication channel may be tuned to a frequency within an allocated RB such as a frequency at about a center frequency of an RB. Also, a transmission bandwidth of a signal transmitted from a transmitter may be limited to frequencies above a minimum frequency of a first RB (e.g., in a lower frequency channel) and below a maximum frequency of a second RB (e.g., in a higher frequency channel).

As shown in FIG. 1 in a particular implementation, mobile device 100, which may also be referred to as a UE (or user equipment), may transmit radio signals to, and receive radio signals from, a wireless communication network. In one example, mobile device 100 may communicate with a cellular communication network by transmitting wireless signals to, or receiving wireless signals from one or more cellular transceivers 110 which may comprise a wireless base transceiver subsystem (BTS), e Node B transceiver or an evolved NodeB (eNodeB) transceiver over wireless communication links 123. Similarly, mobile device 100 may transmit wireless signals to, or receive wireless signals from local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Mobile device 100 may receive or acquire satellite positioning system (SPS) signals 159 from SPS satellites 160. In some implementations, SPS satellites 160 comprising transmitters may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one several regional navigation satellite systems (RNSS') such as, for example, WAAS, EGNOS, QZSS, just to name a few examples.

In particular implementations, and/or as discussed below, mobile device 100 may have circuitry and/or processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

Examples of network technologies that may support wireless communication link 123 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, Bluetooth® (BT) and LTE.

In a particular implementation, cellular transceivers 110 and local transceiver 115 may communicate with servers 140, 150 and/or 155 over a network 130 through links 145. Here, network 130 may comprise any combination of wired or wireless links and may include cellular transceiver 110 and/or local transceiver 115 and/or servers 140, 150 and 155. In a particular implementation, network 130 may comprise Internet Protocol (IP) or other infrastructure capable of facilitating communication between mobile device 100 and servers 140, 150 or 155 through local transceiver 115 or cellular transceiver 110. In an embodiment, network 130 may also facilitate communication between mobile device 100, servers 140, 150 and/or 155. In another implementation, network 130 may comprise cellular communication network infrastructure such as, for example, a base station controller or packet based or circuit based switching center (not shown) to facilitate mobile cellular communication with mobile device 100. In a particular implementation, network 130 may comprise local area network (LAN) elements such as WiFi APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one implementation, network 130 may include one or more serving gateways or Packet Data Network gateways. In addition, one or more of servers 140, 150 and 155 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 130.

In particular implementations, and as discussed below, mobile device 100 may have circuitry and processing resources capable of obtaining location related measurements (e.g. for signals received from GPS or other Satellite Positioning System (SPS) satellites 160, cellular transceiver 110 or local transceiver 115 and possibly computing a position fix or estimated location of mobile device 100 based on these location related measurements.

As pointed out above, a mobile device (e.g., mobile device 100) may be allocated RBs on carrier bands in one or more uplink communication channels (e.g., on a wireless communication link 123). Concurrent transmission of RBs in uplink carrier bands may introduce IMD that is likely to interfere with or jam RF receiving functions that rely on processing RF signals received in a frequency band (e.g., SPS signals 159 received from space vehicles 160 or signals in wireless communication link 125 from local transceiver 115). As discussed below in connection with particular implementations, to reduce or eliminate IMD affecting an RF receiving function, a mobile device may tune a local oscillator frequency to affect a center frequency and bandwidth of operation in one or more uplink channels based on an allocation of uplink RBs. For example, a mobile device may tune local oscillators for transmitting RBs in one or more uplink communication channels may center frequencies of RBs. Also, a transmission bandwidth of a signal transmitted from a transmitter may be limited to frequencies above a minimum frequency of a first RB (e.g., in a lower frequency channel) and below a maximum frequency of a second RB (e.g., in a higher frequency channel).

Figure 2:
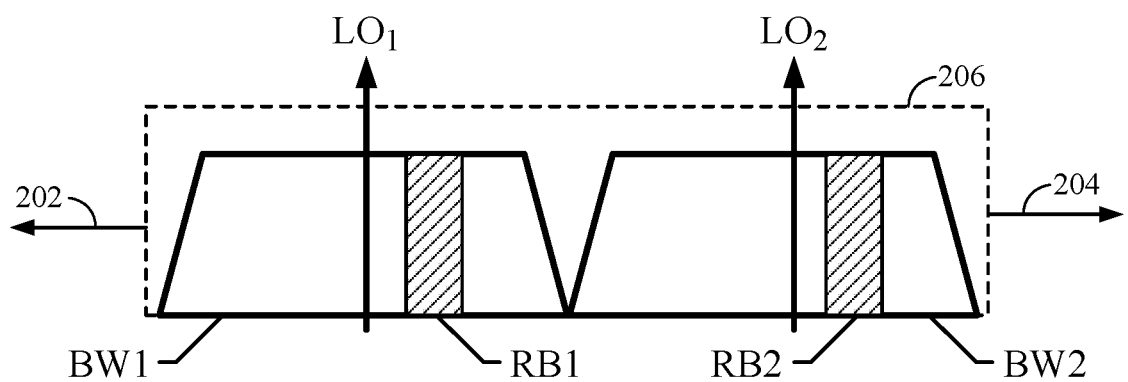
FIGS. 2 through 5 are schematic diagrams of transmission of uplink signal in a transmission spectrum according to embodiments.

As shown in FIG. 2, a network may allocate to a mobile device a first uplink RB RB1 from a first carrier bandwidth BW1 and a second uplink RB RB2 is from a second carrier bandwidth BW2. Local oscillators $LO_1$ and $LO_2$ for transmitting RBs allocated for uplink messaging may be centered at the center of a carrier bandwidths BW1 and BW2 as shown. As shown in FIG. 2, a mobile device transmitting an RB in a carrier bandwidth may transmit signal energy over an entirety over the carrier bandwidth while transmission of valid data (e.g., message parameters) is limited to a portion of the carrier bandwidth occupied by the RB. For example, a mobile device transmitting RB RB1 may transmit signal energy over an entirety of carrier bandwidth BW1 while transmission of valid data is limited to a portion of the carrier bandwidth occupied by RB RB1. Also, a transmitter for transmitting the allocated uplink RBs extends for a spectrum including an entirety of carrier bandwidths BW1 and BW2. A transmission band 206 of a transmitter of a mobile device for transmission of uplink signals in carrier bandwidths BW1 and BW2 may be determined by a front end transmission filter which to apply a spectrum emission mask (SEM). Such an SEM may reject transmission of signal energy in frequencies 202 below transmission band 206 and frequencies 204 above transmission band 206 (e.g., by maintaining a sufficient adjacent channel leakage ratio for frequencies 202 and 204).

Figure 3:
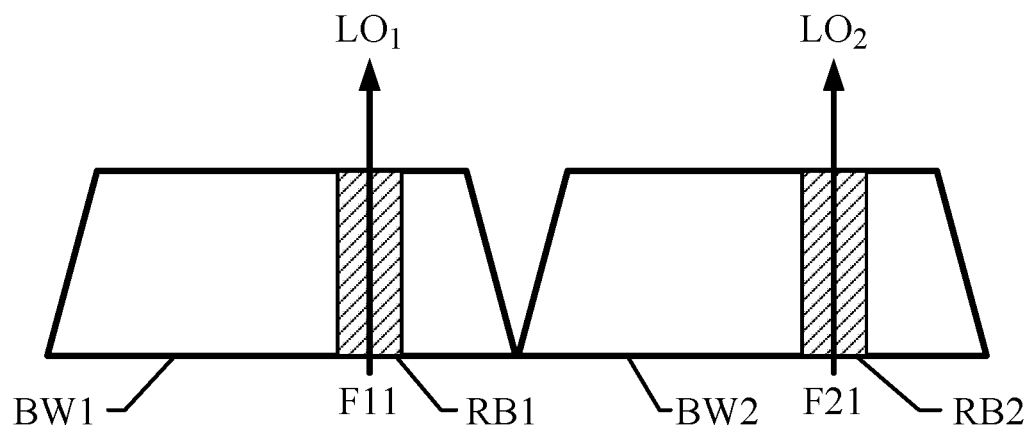

According to an embodiment, RBs RB1 and RB2 may be transmitted as subcarrier signals to local oscillators $LO_1$ and $LO_2$. As pointed out above, concurrent transmission of RBs using local oscillators $LO_1$ and $LO_2$ may impart IMD (e.g., according to expression (1)) that affects one or more RF receiving functions. In the example implementation of FIG. 3, local oscillators $LO_1$ and $LO_2$ for carrier bandwidths BW1 and BW2 may be tuned to frequencies within allocated uplink RBs RB1 and RB2. For example, as illustrated, $LO_1$ and $LO_2$ may be tuned to center frequencies of allocated uplink RBs RB1 and RB2 with a first local oscillator $LO_1$ tuned to a center frequency F11 of RB1 and a second local oscillator $LO_2$ tuned to a center frequency F21 of RB2. In this context, a "center frequency" of an RB as referred to herein means a frequency about midway between or equidistant minimum and maximum frequencies of the RB allowing for tolerable local oscillator drift or jitter. Additionally, emissions from a transmitter for transmitting the uplink RBs may be limited to frequencies above a lowest frequency of a lowest frequency RB and frequencies below a highest frequency of a highest frequency RB.

Figure 4:
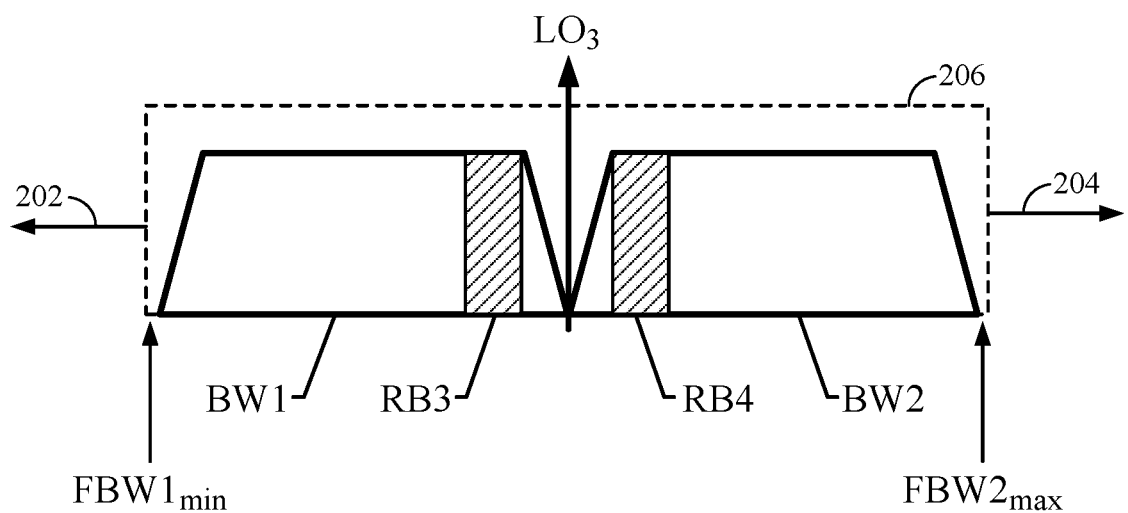
Figure 5:
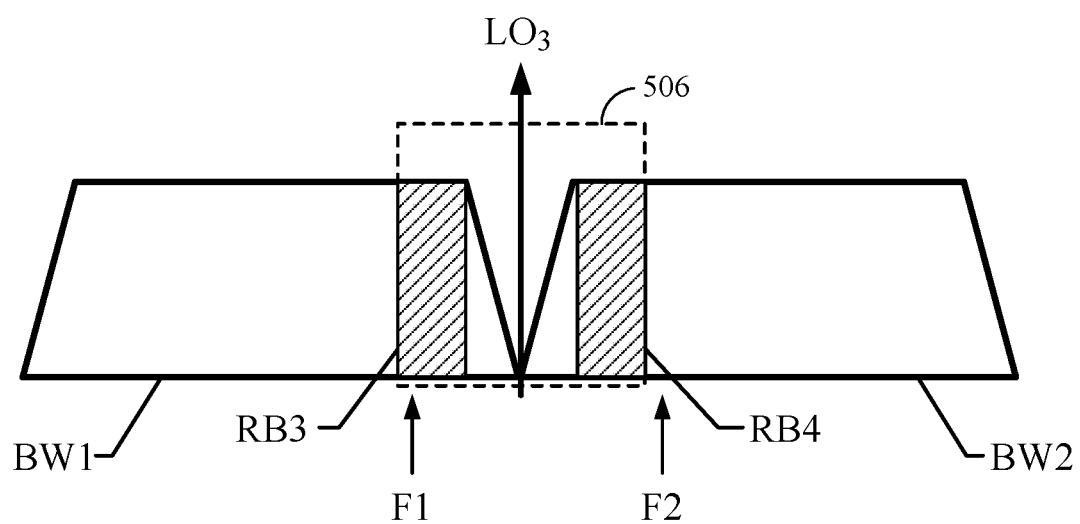

In another embodiment, a network may allocate to a mobile device uplink RBs RB3 and RB4 allocated in different but adjacent carrier bandwidths may be closely spaced in frequency as shown in FIG. 4 below. As pointed out above in connection with FIG. 2, transmission of RB3 as a subcarrier signal to a first local oscillator (e.g., $LO_1$) at a center frequency of carrier bandwidth BW1 concurrently with transmission of RB4 as a subcarrier signal to a second local oscillator (e.g., $LO_2$) may impart IMD. As shown in FIG. 4 according to an embodiment, RB3 and RB4 may be transmitted as subcarrier signals to a local oscillator $LO_3$ at a frequency approximately between frequencies of RB3 and RB4. Here, a frequency of local oscillator $LO_3$ may be determined or selected as being approximately equidistant from center frequencies of RB3 and RB4. In this context, "approximately between" frequencies or "equidistant from" frequencies as referred to herein means a frequency that bisects center frequencies of allocated RBs allowing for tolerable local oscillator drift or jitter. Here, use of a single local oscillator $LO_3$ to transmit RB3 and RB4 as subcarrier signals may eliminate IMD from use of two local oscillators to individually transmit RB3 and RB4. Furthermore, as shown in FIG. 5, transmission filter parameters may be adjusted to reduce transmission band 206 bounded by frequency FBW1$_{min}$ (minimum transmission frequency of carrier bandwidth BW1) and frequency FBW2$_{max}$ (maximum transmission frequency of carrier bandwidth BW2) to transmission band 506. In particular, a filter parameters of a mobile device at a transmitter may have an SEM to reject transmission of signal energy in frequencies by maintaining a sufficient adjacent channel leakage ratio for frequencies above frequency F2 (a highest transmission frequency for RB4) and below frequency F1 (a lowest transmission frequency for RB3). Limiting transmission of uplink signals to signals in transmission band 506 may further reduce IMD impacting one or more RF receiving functions.

Figure 6A:
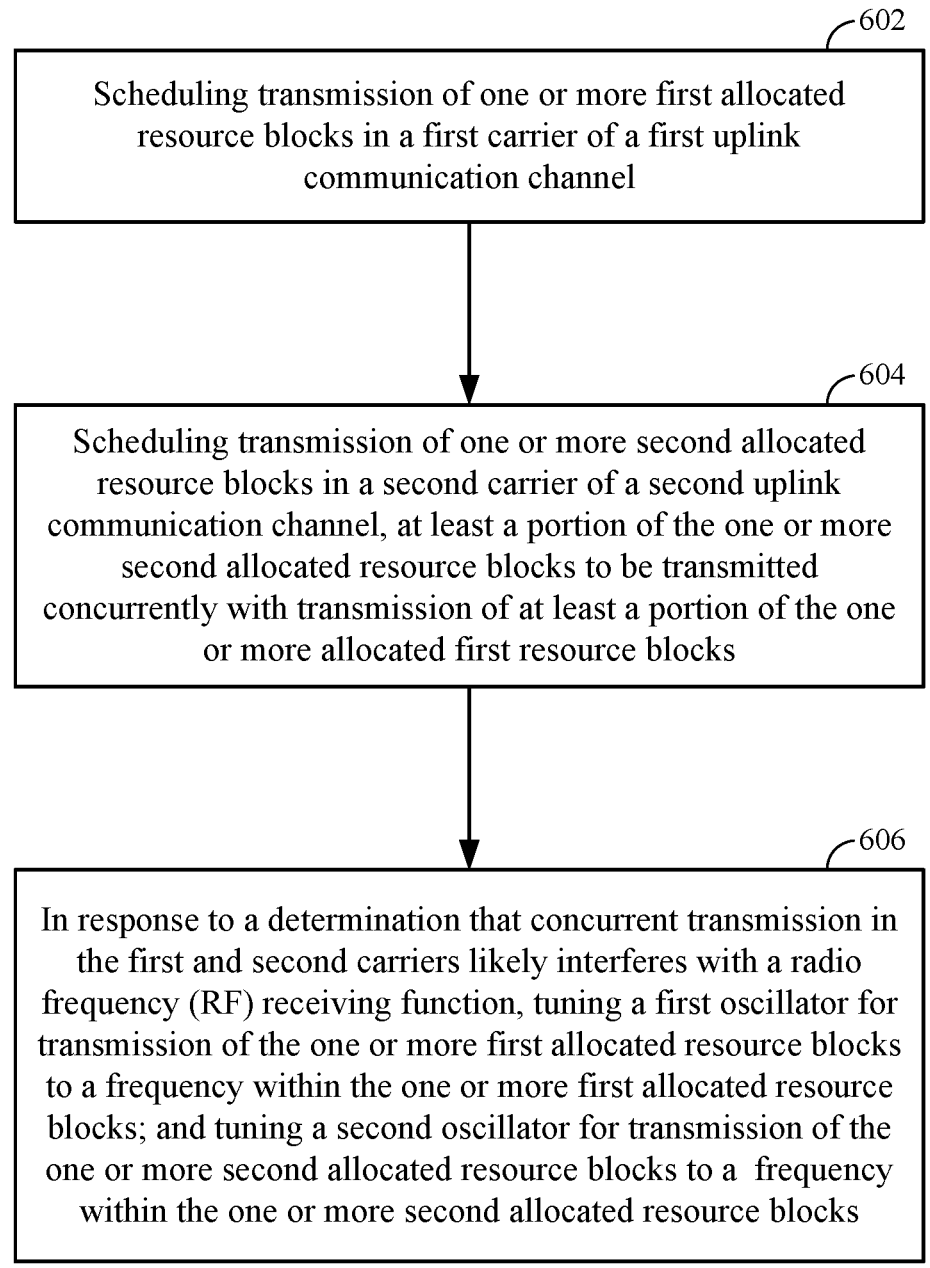
FIGS. 6A and 6B are flow diagrams of processes for transmission of resource blocks in a transmission medium according to particular embodiments.

FIG. 6A is a flow diagram of a process performed at a mobile device to control concurrent transmission of RBs in different carrier bandwidths to reduce, mitigate or avoid IMD impacting one or more RF receiving functions performed on the mobile device. According to an embodiment, RBs may be allocated or defined over a particular time duration defined by a network (e.g., particular discrete uplink slots, frames or subframes having network defined start times and end times). In this context, first and second RBs are "concurrently transmitted" if at least a portion of the first RB overlaps in time with a portion of the second RB. For example, the first and second RB may overlap in time if at least a portion of the first RB and a portion of the second are allocated the same discrete slot, frame or subframe, or other temporal unit.

In one example implementation, a mobile device may be allocated RBs for concurrent transmission in one or more uplink communication channels based on a PDCCH symbol received in a downlink signal. For example, the mobile device may decode a PDCCH symbol received in a downlink signal to determine RBs for transmission in particular uplink carrier bandwidths (e.g., BW1 and BW2 illustrated in FIGS. 2 through 5).

Blocks 602 and 604 may comprise scheduling of transmission of allocated resource blocks (e.g., allocated according to a decoded PDCCH symbol) for concurrent transmission. That is, one or more first resource blocks in a first carrier band are scheduled for transmission concurrently (e.g., overlapping with) transmission of one or more second resource blocks in a second carrier band. As discussed above, concurrent transmission of resource blocks in different carrier bands may impart IMD affecting one or more RF receiving functions. Accordingly, in response to a determination that transmission of the one or more first resource blocks currently with transmission of the one or more second resource blocks imparts IMD affecting one or more RF receiving functions, block 606 may perform actions to mitigate or reduce such IMD.

In a particular implementation, block 606 may comprise tuning a first oscillator for transmission of the one or more first allocated resource blocks to about or approximately a center frequency of the one or more first allocated resource blocks, and tuning a second oscillator for transmission of the one or more second allocated resource blocks to about or approximately a center frequency of the one or more second allocated resource blocks. As shown in the example implementation of FIG. 3, a first local oscillator LO$_1$ is tuned to a frequency F11 at about or approximately a center frequency of RB RB1 while a second local oscillator LO$_2$ is tuned to a frequency F21 at about or approximately a center frequency of RB RB2. In an alternative implementation, additional actions to mitigate or reduce such IMD in addition to actions set forth in block 606 may include limiting concurrent transmission of the one or more allocated first resource blocks and one or more allocated second resource blocks to frequencies above a minimum frequency of the one or more allocated first resource blocks and below a maximum frequency of the one or more allocated resource blocks. Continuing with the example of FIG. 3, a transmitter of a mobile device may employ an SEM to reject transmission of signal energy in frequencies below a lowest frequency boundary of RB RB1 and above a highest boundary of RB2 (e.g., by maintaining a sufficient adjacent channel leakage ratio for frequencies below a lowest frequency boundary of RB RB1 and above a highest frequency boundary of RB RB2). This may be accomplished or implemented by, for example, setting parameters of an analog filter controlling emission of radio frequency (RF) signal energy from a transmitter to be above the lowest frequency boundary of RB RB1 and below the highest frequency boundary of RB RB2.

Figure 6B:
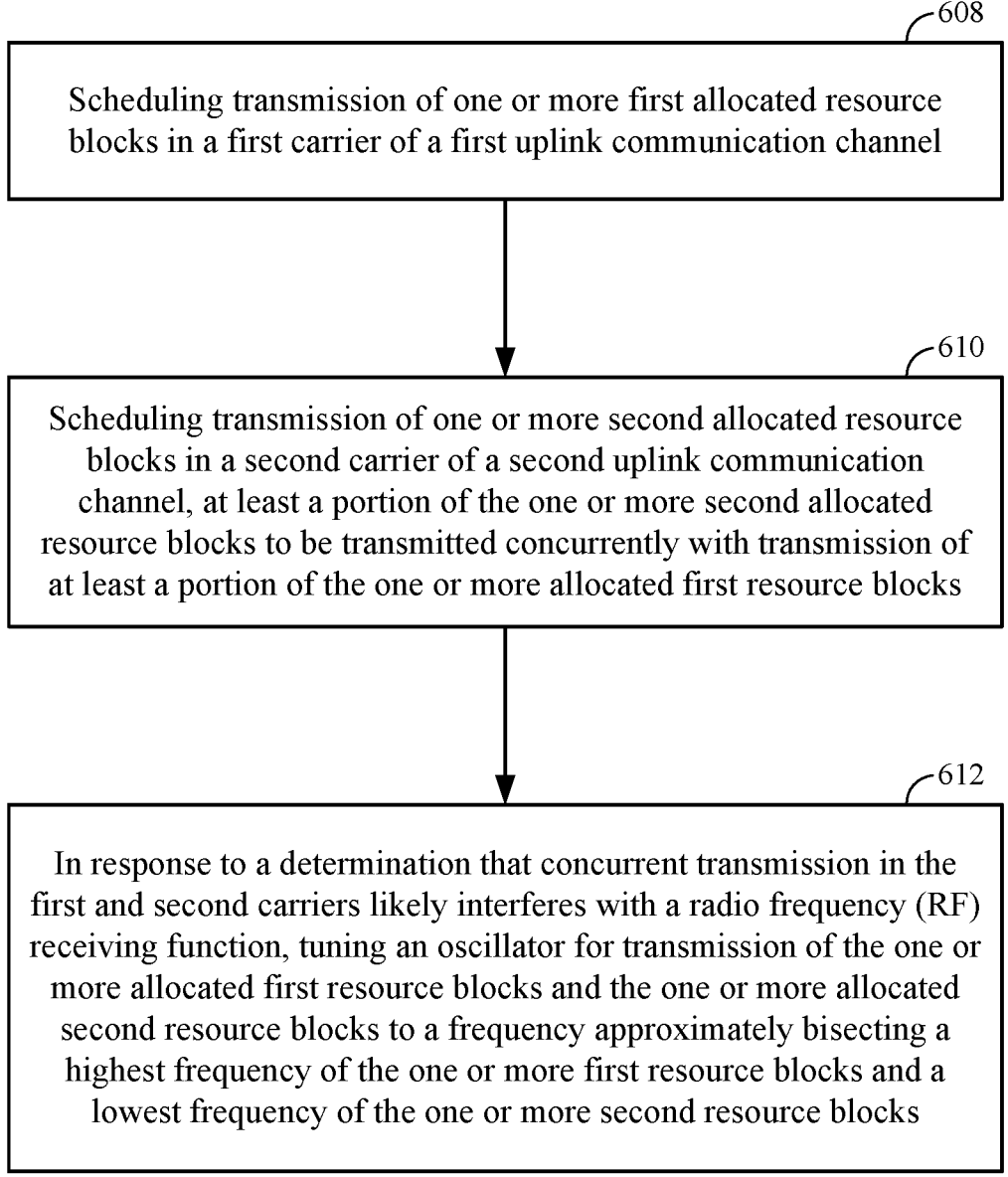

FIG. 6B is a flow diagram of an alternative process performed at a mobile device to control concurrent transmission of RBs in different carrier bandwidths to reduce, mitigate or avoid IMD impacting one or more RF receiving functions performed on the mobile device. Blocks 608 and 610 may be performed at a mobile device as described above for blocks 602 and 604. Block 612 may comprise actions to be performed at the mobile device to reduce, mitigate or eliminate IMD affecting one or more RF receiving functions including tuning an oscillator at a transmitter of the mobile device for transmission of the one or more allocated first resource blocks and the one or more allocated second resource blocks to a frequency approximately bisecting a highest frequency of the one or more first resource blocks and a lowest frequency of the one or more second resource blocks. For example, as shown in the particular example of FIG. 4, a local oscillator LO$_3$ is tuned to a frequency that approximately bisects a highest frequency of RB RB4 and a lowest frequency of RB3. Here, according to an embodiment, RBs RB3 and RB4 may be transmitted as subcarrier signals for signal energy transmitted according to local oscillator LO$_3$.

In an alternative implementation, additional actions to mitigate or reduce such IMD in addition to actions set forth in block 612 may include limiting concurrent transmission of the one or more first resource blocks and second resource blocks to frequencies above a minimum frequency of the one or more first allocated resource blocks and below a maximum frequency of the one or more allocated second allocated resource blocks. For example, as shown in the particular example of FIG. 5, a mobile device may employ an SEM to reject transmission of signal energy in frequencies below a lowest frequency boundary F1 of RB RB3 and above a highest frequency boundary F2 of RB RB2 (e.g., by maintaining a sufficient adjacent channel leakage ratio for frequencies below F1 and above F2). This may be accomplished or implemented by, for example, setting parameters of an analog filter controlling emission of radio frequency (RF) signal energy from a transmitter to be above frequency F1 and below frequency F2.

According to an embodiment, a mobile device may apply any one of several techniques to determine whether transmission in first and second carrier bands (e.g., for transmission of RBs allocated to uplink channels in the first and second carrier bands) is likely to produce IMD impacting one or more receiving functions (e.g., as a precondition to performing actions at block 606 or 612). A mobile device may, using any one of several techniques, determine that concurrent transmission of multiple RBs (e.g., in first and second uplink carrier bands) likely interferes with at least one radio frequency (RF) receiving function. In one implementation, a mobile device may determine whether concurrent transmission at a first local oscillator of a first carrier band for transmitting a first RB and transmission at a second local oscillator of a second carrier band for transmitting a second RB imparts IMD impacting an RF receiving function using a look up table. For example, such a look up table may associate combinations of local oscillator frequencies with potentially impacted RF receiving functions (e.g., GNSS, Bluetooth® or WiFi). Alternatively, a mobile device may determine whether concurrent transmission at a first local oscillator of a first carrier band for transmitting a first RB and transmission at a second local oscillator of a second carrier band for transmitting a second RB imparts IMD impacting an RF receiving function by performing computations based on frequencies of the first and second local oscillators (e.g., according to expression (1) above).

In particular scenarios, processes described above in connection with FIGS. 6A and 6B may not completely or sufficiently eliminate or remove IMD impacting an RF receiving function. For example, remaining IMD signal power in a frequency band of an RF receiving function may still be significantly high so as to impact the RF receiving function. According to an embodiment, if action to be taken at block 606 or 612 to reduce or mitigate IMD from transmission of resource blocks in first and second carrier bands is not sufficient, a mobile device may take additional or different action to reduce IMD impacting an RF receiving function. As discussed below, such additional or different action may comprise reducing transmission power for an uplink communication channel of the first carrier or the second carrier band, or tuning a local oscillator to a different frequency. In one embodiment, to determine whether action to be taken at block 606 or 612 is or would be sufficient to reduce or mitigate IMD, a mobile device may measure signal strength of remaining IMD at a receiver subsequent to execution of block 606 or 602 at a particular frequency band. In another embodiment, a mobile device prior to execution of block 606 or 612 may determine a priori whether IMD would likely be sufficiently eliminated or mitigated by actions performed at block 606 or 612 (e.g., by accessing a look up table or computing expected IMD based on expression (1)).

If action at block 606 or 612 does not or would not sufficiently remove or mitigate IMD impacting an RF receiving function of a mobile device, the mobile device may reduce transmission power on an uplink communication channel of either the first carrier or second carrier. The first carrier or second carrier may be selected for reducing transmission power may be selected using any one of several techniques. For example, depending on which particular carrier of the first and second carriers is determined to contribute a majority of signal power of remaining IMD impacting an RF receiving function (e.g., according to expression (1)), the mobile device may reduce transmission power on an uplink communication channel of the particular carrier band. In one example, a mobile device may evaluate signal power of spectral components of remaining IMD impacting an RF receiving function (e.g., spectral components determined by coefficients "a" and "b" in expression (1)) and power levels used for transmission of the first and second carriers. In another implementation in which a particular carrier of the first and second carriers is operating in a time division duplexing (TDD) mode, the mobile device may reduce transmission power for uplink transmission on the particular carrier operating in the TDD mode.

According to an embodiment, a carrier may operate in a frequency division duplexing (FDD) mode that may, from time to time, enter a discontinuous transmission (DTX) period of operation during which there is an absence of messaging or data (e.g., from an application) to be transmitted in an uplink communication channel of the carrier. In another implementation in which a particular carrier of the first and second carriers is operating in an FDD mode, the mobile device may reduce transmission power for an uplink communication channel that is in or entering a DTX period of operation.

According to an embodiment, some uplink channels may be transmitting control channel messages or other messages comprising critical content. In another implementation in which a particular carrier of the first and second carriers is transmitting control channel messages or other messages comprising critical content, the mobile device may reduce transmission power of an uplink communication channel for that particular carrier.

In a particular implementation, first and second carriers may be transmitted respectively by different first and second physical transmitters with different corresponding physical antennas, for example. Here, such first and second physical transmitters may have a corresponding different spatial isolation from an antenna supporting one or more of the aforementioned receive functions. According to an embodiment, to further reduce remaining IMD impacting an RF receiving function, a mobile device may select a carrier from among multiple carriers transmitted by different physical transmitters) for reducing transmission power based, at least in part, on a physical isolation/separation of the physical transmitter from an antenna supporting the RF receiving function. Modelling remaining IMD impacting an RF receiving function according to expression (1) in a particular example, a first physical transmitter may transmit a first carrier at carrier frequency $F_{c1}$, giving rise to IMD spectral component $a \times F_{c1}$, while a second physical transmitter may transmit a second carrier at carrier frequency $F_2$, giving rise to IMD spectral component $b \times F_2$. In addition to evaluating signal power at spectral components $a \times F_{c1}$ and $b \times F_2$ and placement of these spectral components with respect to a receiving band of the RF receiving function, a mobile device may also consider physical isolation of physical transmitters transmitting at carrier frequencies $F_{c1}$ and $F_{c2}$.

In an alternative to reducing transmission power on an uplink communication channel of a particular carrier band if action to be taken at block 606 or 612 is or would not be sufficient to reduce or mitigate IMD, a mobile device may further affect a transmission frequency of the particular carrier band. To affect an allocation of spectrum for transmission of a resource block in an uplink communication channel, the mobile device may report a lower received power or a lower channel quality indicator (CQI) for the particular carrier to prompt or initiate a change to a different frequency for transmitting RBs in an uplink channel for the different carrier. Here, combination of transmission of RBs at the different frequency, in combination with transmission of RBs at one or more other frequencies, may further reduce IMD impacting an RF receiving function.

In another example, if a particular carrier (of first and second carriers) is operating in an TDD mode, the mobile device may retune the transmission frequency of the particular carrier at an offset so as to reduce or eliminate IMD. According to an embodiment, a mobile device maintaining a communication channel in a TDD mode may transmit signal energy from a transmitter in the communication channel constantly without turning off transmission power. Here, an uplink portion of the TDD communication channel may be tuned to a different frequency during receiving periods. In another embodiment, if a particular communication channel in a TDD mode is in or entering a DTX period of operation, a frequency for the uplink channel for that particular carrier may be retuned at an offset.

Figure 7:
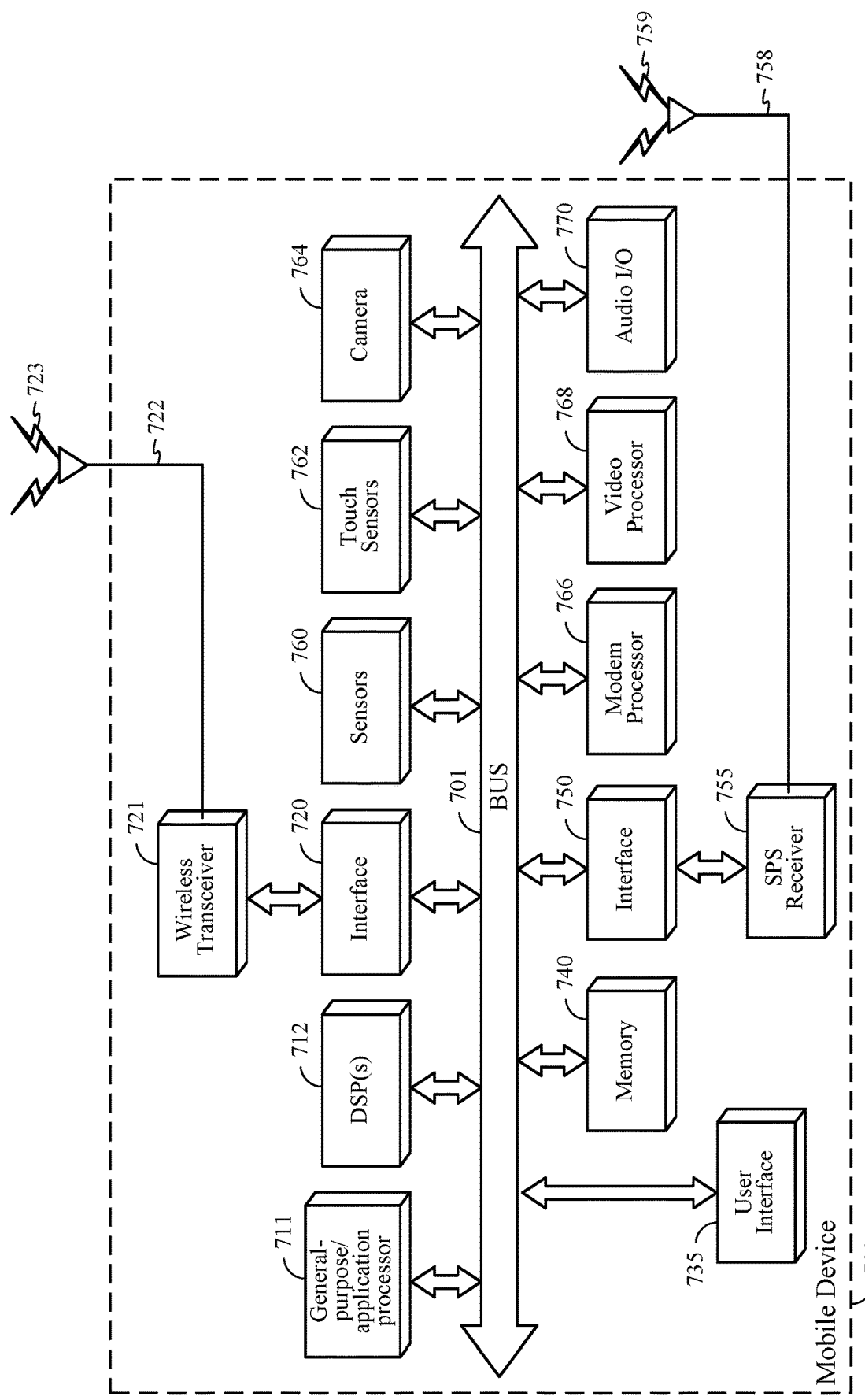
FIG. 7 is a schematic block diagram of a mobile device, in accordance with an example implementation.
Figure 8:
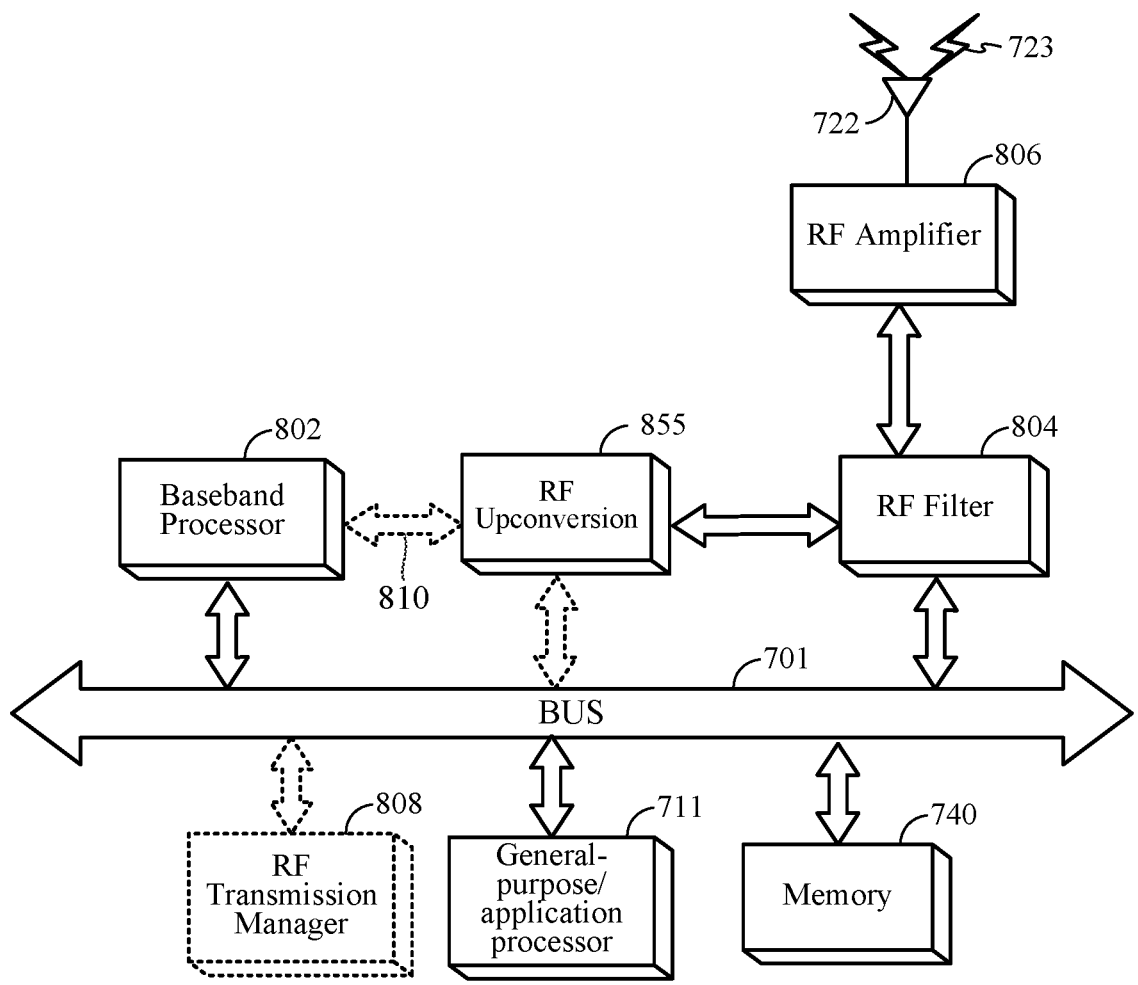
FIG. 8 is a schematic diagram of an example computing system according to an alternative implementation.

Subject matter shown in FIGS. 7 and 8 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device," "mobile device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device," "mobile device" and/or similar terms, then, it is intended, pursuant to that statutory section, that corresponding structure, material and/or acts for performing one or more functions be understood and be interpreted to be described at least in FIGS. 6A and 6B, and corresponding text of the present disclosure.

FIG. 7 is a schematic diagram of a mobile device 700 according to an embodiment. Mobile device 100 shown in FIG. 1 may comprise one or more features of mobile device 700 shown in FIG. 7. In certain embodiments, mobile device 700 may comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 721 may transmit signals on an uplink channel and receive signals on a downlink channel as discussed above.

Mobile device 700 may also comprise SPS receiver 755 capable of receiving and acquiring SPS signals 759 via SPS antenna 758 (which may be integrated with antenna 722 in some embodiments). SPS receiver 755 may also process, in whole or in part, acquired SPS signals 759 for estimating a location of mobile device 700. In some embodiments, general-purpose processor(s) 711, memory 740, digital signal processor(s) (DSP(s)) 712 and/or specialized processors (not shown) may also be utilized to process acquired SPS signals, in whole or in part, and/or calculate an estimated location of mobile device 700, in conjunction with SPS receiver 755. Storage of SPS or other signals (e.g., signals acquired from wireless transceiver 721) or storage of measurements of these signals for use in performing positioning operations may be performed in memory 740 or registers (not shown). General-purpose processor(s) 711, memory 740, DSP(s) 712 and/or specialized processors may provide or support a location engine for use in processing measurements to estimate a location of mobile device 700. In a particular implementation, all or portions of actions or operations set forth for process 700 may be executed by general-purpose processor(s) 711 or DSP(s) 712 based on machine-readable instructions stored in memory 740.

Also shown in FIG. 7, digital signal processor(s) (DSP(s)) 712 and general-purpose processor(s) 711 may be connected to memory 740 through bus 701. A particular bus interface (not shown) may be integrated with the DSP(s) 712, general-purpose processor(s) 711 and memory 740. In various embodiments, functions may be performed in response to execution of one or more machine-readable instructions stored in memory 740 such as on a computer-readable storage medium, such as RAM, ROM, FLASH, or disc drive, just to name a few example. The one or more instructions may be executable by general-purpose processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions or actions described above in connection with FIGS. 6A and 6B.

Also shown in FIG. 7, a user interface 735 may comprise any one of several devices such as, for example, a speaker, microphone, display device, vibration device, keyboard, touch screen, just to name a few examples. In a particular implementation, user interface 735 may enable a user to interact with one or more applications hosted on mobile device 700. For example, devices of user interface 735 may store analog or digital signals on memory 740 to be further processed by DSP(s) 712 or general purpose processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 700 may comprise touch sensors 762 responsive to touching or pressure on a keyboard or touch screen device.

Mobile device 700 may also comprise a dedicated camera device 764 for capturing still or moving imagery. Camera device 764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 711 or DSP(s) 712. Alternatively, a dedicated video processor 768 may perform conditioning, encoding, compression or manipulation of signals representing captured images. Additionally, video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, camera imagers, microphones, just to name few examples. Sensors 760 may generate analog or digital signals that may be stored in memory 740 and processed by DPS(s) 712 or general purpose application processor 711 in support of one or more applications such as, for example, applications directed to positioning or navigation operations.

In a particular implementation, mobile device 700 may comprise a dedicated modem processor 766 capable of performing baseband processing of signals received and downconverted at wireless transceiver 721 or SPS receiver 755. Similarly, modem processor 766 may perform baseband processing of signals to be upconverted for transmission by wireless transceiver 721. In alternative implementations, instead of having a dedicated modem processor, baseband processing may be performed by a general purpose processor or DSP (e.g., general purpose/application processor 711 or DSP(s) 712). It should be understood, however, that these are merely examples of structures that may perform baseband processing, and that claimed subject matter is not limited in this respect.

FIG. 8 is a schematic diagram of an alternative features of mobile device 700 according to a particular implementation. Here, wireless transceiver 721 may comprise RF amplifier 806, RF filter 804 and RF upconversion circuit 855. Modem processor 766 may comprise baseband processor 802 for encoding messages for transmission in RBs allocated by a network from uplink communication channels. Upconversion circuit may upconvert encoded baseband signals to a radio frequency according to one or more local oscillators as discussed above. RF filter 804 may apply a spectrum emission mask (SEM) to reject transmission of signal energy above and/or below certain frequencies (e.g., by maintaining a sufficient adjacent channel leakage ratio for frequencies 202 and 204).

According to an embodiment, parameters of upconversion circuit 855 and RF filter 804 may be adjustable or programmable to implement features as discussed above in connection with FIGS. 6A and 6B. For example, parameters provided on bus 701 may configure or program upconversion circuit 855 to tune one or more local oscillator frequencies in response to a determination that concurrent transmission in first and second carrier bands likely interferes with one or more RF receiving functions. Similarly, parameters provided on bus 701 may configure or program RF filter to affect an SEM to reject transmission of signal energy above and/or below certain frequencies in response to a determination that concurrent transmission in first and second carrier bands likely interferes with one or more RF receiving functions.

According to an embodiment, parameters to configure or program upconversion circuit 855 and/or RF filter 804 may be generated by general purpose/application processor 711 by executing computer readable instructions stored in memory 740. Alternatively, parameters to configure or program upconversion circuit 855 and/or RF filter 804 may be generated by RF transmission manager 808 operating as a low power controller.

One embodiment described above is directed to a method, at a mobile device, comprising: scheduling transmission of one or more first allocated resource blocks in a first carrier of a first uplink communication channel; scheduling transmission of one or more second allocated resource blocks in a second carrier of a second uplink communication channel, at least a portion of the one or more second resource blocks to be transmitted concurrently with transmission of at least a portion of the one or more first resource blocks; and in response to a determination that concurrent transmission in the first and second carrier likely interferes with a radio frequency (RF) receiving function, tuning an oscillator for transmission of the one or more allocated first resource blocks and the one or more allocated second resource blocks to a frequency approximately bisecting a highest frequency of the one or more first resource blocks and a lowest frequency of the one or more second resource blocks. In one particular implementation, the method further comprises limiting concurrent transmission of the one or more first resource blocks and second resource blocks to frequencies above a minimum frequency of the one or more first allocated resource blocks and below a maximum frequency of the one or more allocated second allocated resource blocks. For example, limiting concurrent transmission of the one or more first resource blocks and second resource blocks to frequencies above the minimum frequency of the first frequency channel and below the maximum frequency of the second frequency channel further may comprise setting parameters of an analog filter controlling emission of radio frequency (RF) signal energy from a transmitter to be above the minimum frequency of the first frequency channel and below the maximum frequency of the second frequency channel. In another particular implementation, the method further comprises decoding a PDCCH symbol received in a downlink signal to determine an allocation of resource blocks in the first and second carriers of the uplink signal. In another particular implementation, the method further comprises retuning a frequency of the first uplink communication channel in response to a determination of a contribution of transmission of the first allocated resource blocks to intermodulation distortion affecting the RF receiving function. In another particular implementation, the first uplink communication channel is operating in a time division duplex mode. In another particular implementation, the method further comprises retuning the frequency of the first uplink communication channel in response to the first uplink communication channel entering or being in a DTX period of operation. In another particular implementation, the method further comprises retuning the frequency of the first uplink communication channel in response to an allocation of a resource block to reduce intermodulation distortion affecting the RF receiving function while transmitting data in the allocated resource block.

Another embodiment described above is directed to a mobile device comprising: one or more transmitter devices; and one or more processors configured to: schedule transmission of one or more first allocated resource blocks through the one or more transmitter devices in a first carrier of a first uplink communication channel; schedule transmission of one or more second allocated resource blocks through the one or more transmitter devices in a second carrier of a second uplink communication channel, at least a portion of the one or more second resource blocks to be transmitted concurrently with transmission of at least a portion of the one or more first resource blocks; and in response to a determination that concurrent transmission in the first and second carrier likely interferes with a radio frequency (RF) receiving function, tune an oscillator for transmission through the one or more transmitter devices of the one or more allocated first resource blocks and the one or more allocated second resource blocks to a frequency approximately bisecting a highest frequency of the one or more first resource blocks and a lowest frequency of the one or more second resource blocks. In one particular implementation, the one or more processors are further configured to limit concurrent transmission of the one or more first resource blocks and second resource blocks to frequencies above a minimum frequency of the one or more first allocated resource blocks and below a maximum frequency of the one or more allocated second allocated resource blocks. For example, the one or more processors may be configured to limit concurrent transmission of the one or more first resource blocks and second resource blocks to frequencies above the minimum frequency of the first frequency channel and below the maximum frequency of the second frequency channel further by setting parameters of an analog filter controlling emission of radio frequency (RF) signal energy from the transmitter to be above the minimum frequency of the first frequency channel and below the maximum frequency of the second frequency channel. In another particular implementation, the one or more processors may be further configured to decode a PDCCH symbol received in a downlink signal to determine an allocation of resource blocks in the first and second carriers of the uplink signal. In another particular implementation, the one or more processors may be further configured to retune a frequency of the first uplink communication channel in response to a determination of a contribution of transmission of the first allocated resource blocks to intermodulation distortion affecting the RF receiving function. In another particular implementation, the first uplink communication channel may operate in a time division duplex mode. In another particular implementation, the one or more processors may be further configured to retune the frequency of the first uplink communication channel in response to the first uplink communication channel entering or being in a DTX period of operation. In another particular implementation, the one or more processors may be further configured to retune the frequency of the first uplink communication channel in response to an allocation of a resource block to reduce intermodulation distortion affecting the RF receiving function while transmitting data in the allocated resource block.

Another embodiment described herein is directed to a non-transitory storage medium comprising computer-readable instructions stored thereon which are executable by a processor of a mobile to: schedule transmission of one or more first allocated resource blocks in a first carrier of a first uplink communication channel; schedule transmission of one or more second allocated resource blocks in a second carrier of a second uplink communication channel, at least a portion of the one or more second resource blocks to be transmitted concurrently with transmission of at least a portion of the one or more first resource blocks; and in response to a determination that concurrent transmission in the first and second carrier likely interferes with a radio frequency (RF) receiving function, tune an oscillator for transmission of the one or more allocated first resource blocks and the one or more allocated second resource blocks to a frequency approximately bisecting a highest frequency of the one or more first resource blocks and a lowest frequency of the one or more second resource blocks. In one particular implementation, the instructions may be further executable by the processor to limit concurrent transmission of the one or more first resource blocks and second resource blocks to frequencies above a minimum frequency of the one or more first allocated resource blocks and below a maximum frequency of the one or more allocated second allocated resource blocks. For example, concurrent transmission of the one or more first resource blocks and second resource blocks may be limited to frequencies above the minimum frequency of the first frequency channel and below the maximum frequency of the second frequency channel by setting parameters of an analog filter controlling emission of radio frequency (RF) signal energy from a transmitter to be above the minimum frequency of the first frequency channel and below the maximum frequency of the second frequency channel. In another particular implementation, the instructions may be further executable by the processor to decode a PDCCH symbol received in a downlink signal to determine an allocation of resource blocks in the first and second carriers of the uplink signal. In another particular implementation, the instructions are further executable by the processor to retune a frequency of the first uplink communication channel in response to a determination of a contribution of transmission of the first allocated resource blocks to intermodulation distortion affecting the RF receiving function. In another particular implementation, the first uplink communication channel may operate in a time division duplex mode. In another particular implementation, the instructions are further executable by the processor to retune the frequency of the first uplink communication channel in response to the first uplink communication channel entering or being in a DTX period of operation. In another particular implementation, the instructions are further executable by the processor to retune the frequency of the first uplink communication channel in response to an allocation of a resource block to reduce intermodulation distortion affecting the RF receiving function while transmitting data in the allocated resource block.

Another embodiment described herein is directed to a mobile device, comprising: means for scheduling transmission of one or more first allocated resource blocks in a first carrier of a first uplink communication channel; means for scheduling transmission of one or more second allocated resource blocks in a second carrier of a second uplink communication channel, at least a portion of the one or more second resource blocks to be transmitted concurrently with transmission of at least a portion of the one or more first resource blocks; and means for tuning an oscillator for transmission of the one or more allocated first resource blocks and the one or more allocated second resource blocks to a frequency approximately bisecting a highest frequency of the one or more first resource blocks and a lowest frequency of the one or more second resource blocks in response to a determination that concurrent transmission in the first and second carrier likely interferes with a radio frequency (RF) receiving function. In one particular implementation, the mobile device further comprises means for limiting concurrent transmission of the one or more first resource blocks and second resource blocks to frequencies above a minimum frequency of the one or more first allocated resource blocks and below a maximum frequency of the one or more allocated second allocated resource blocks. For example, the means for limiting concurrent transmission of the one or more first resource blocks and second resource blocks to frequencies above the minimum frequency of the first frequency channel and below the maximum frequency of the second frequency channel further may comprise means for setting parameters of an analog filter controlling emission of radio frequency (RF) signal energy from a transmitter to be above the minimum frequency of the first frequency channel and below the maximum frequency of the second frequency channel. In another particular implementation, the mobile device further comprises means for decoding a PDCCH symbol received in a downlink signal to determine an allocation of resource blocks in the first and second carriers of the uplink signal. In another particular implementation, the mobile device further comprises means for retuning a frequency of the first uplink communication channel in response to a determination of a contribution of transmission of the first allocated resource blocks to intermodulation distortion affecting the RF receiving function. In another particular implementation, the first uplink communication channel operates in a time division duplex mode. In another particular implementation, the mobile device further comprises means for retuning the frequency of the first uplink communication channel in response to the first uplink communication channel entering or being in a DTX period of operation. In another particular implementation, the mobile device further comprises means for retuning the frequency of the first uplink communication channel in response to an allocation of a resource block to reduce intermodulation distortion affecting the RF receiving function while transmitting data in the allocated resource block.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, comprising:
    scheduling transmission of one or more first allocated resource blocks in a first carrier of a first uplink communication channel;
    scheduling transmission of one or more second allocated resource blocks in a second carrier of a second uplink communication channel, at least a portion of the one or more second allocated resource blocks to be transmitted concurrently with transmission of at least a portion of the one or more first allocated resource blocks;
    in response to a determination that concurrent transmission in the first carrier and the second carrier likely interferes with a radio frequency (RF) receiving function:
        tuning a first oscillator for transmission of the one or more first allocated resource blocks to a first frequency within the one or more first allocated resource blocks; and
        tuning a second oscillator for transmission of the one or more second allocated resource blocks to a second frequency within the one or more second allocated resource blocks; and
        adjusting an uplink transmission bandwidth size and location to limit uplink transmissions, from the mobile device, to frequencies above a minimum frequency of the one or more first allocated resource blocks and below a maximum frequency of the one or more second allocated resource blocks.

2. The method of claim 1, wherein adjusting the uplink transmission bandwidth to limit uplink transmissions to frequencies above the minimum frequency of the one or more first allocated resource blocks and below the maximum frequency of the one or more second allocated resource blocks further comprises setting parameters of an analog filter controlling emission of RF signal energy from a transmitter to be above the minimum frequency of the one or more first allocated resource blocks and below the maximum frequency of the one or more second allocated resource blocks.

3. The method of claim 1, and further comprising decoding a PDCCH symbol received in a downlink signal to determine an allocation of resource blocks in the first and second carriers of the uplink signal.

4. The method of claim 1, wherein the RF receiving function comprises processing received satellite positioning system (SPS) signals, processing received Bluetooth® signals or processing received WiFi signals, or a combination thereof.

5. The method of claim 1, and further comprising determining that concurrent transmission in the first carrier and the second carrier likely interferes with the RF receiving function based, at least in part, on application of local oscillator frequencies for transmission in the first and second carriers to a look up table.

6. The method of claim 1, and further comprising reducing a transmission power in the first uplink communication channel in response to a determination of a contribution of transmission of the first allocated resource blocks to intermodulation distortion affecting the RF receiving function.

7. The method of claim 1, wherein the first uplink communication channel is operating in a frequency division duplexing mode, the method further comprising reducing a transmission power in the first uplink communication channel in response to a determination that the first uplink channel is operating in a time division duplexing (TDD) mode.

8. The method of claim 1, the method further comprising reducing a transmission power in the first uplink communication channel in response to a determination that the second uplink communication channel is transmitting control channel messages or other messages comprising critical content.

9. The method of claim 1, and further in response to the determination that concurrent transmission in the first carrier and the second carrier likely interferes with the radio frequency (RF) receiving function, transmitting a message indicating a lower CQI value for the uplink communication channel to initiate a change in a resource block allocation in the first uplink communication channel.

10. The method of claim 1, wherein the mobile device comprises a first physical transmitter to transmit the first carrier in the first uplink communication channel and a second physical transmitter to transmit the second carrier in the second uplink communication channel, and wherein the method further in response to the determination that concurrent transmission in the first carrier and the second carrier likely interferes with the radio frequency (RF) receiving function comprises:

determining remaining intermodulation distortion following tuning the first oscillator to the frequency within the one or more first allocated resource blocks and tuning the second oscillator to the frequency within the one or more second allocated resource blocks;

selecting the first physical transmitter or the second physical transmitter based, at least in part, on a physical isolation of the first transmitter from a receiver supporting the RF receiving function and a physical isolation of the second transmitter from the receiver supporting the RF receiving function; and reducing transmission power on the selected physical transmitter.

11. The method of claim 10, wherein selecting the first physical transmitter or the second physical transmitter further comprises selecting the first physical transmitter or the second physical transmitter further based, at least in part, on signal power of spectral components of the remaining intermodulation distortion.

12. A mobile device, comprising:

a transmitter for transmitting messages in uplink communication channels; and one or more processors configured to:

schedule transmission of one or more first allocated resource blocks through the transmitter in a first carrier of a first uplink communication channel;

schedule transmission of one or more second allocated resource blocks through the transmitter in a second carrier of a second uplink communication channel, at least a portion of the one or more second allocated resource blocks to be transmitted concurrently with transmission of at least a portion of the one or more first allocated first resource blocks;

in response to a determination that concurrent transmission in the first carrier and the second carrier likely interferes with a radio frequency (RF) receiving function:

tune a first oscillator at the transmitter for transmission of the one or more first allocated resource blocks to a first frequency within the one or more first allocated resource blocks; and tune a second oscillator at the transmitter for transmission of the one or more second allocated resource blocks to a second frequency within the one or more second allocated resource blocks; and adjust an uplink transmission bandwidth size and location to limit uplink transmissions, from the mobile device, to frequencies above a minimum frequency of the one or more first allocated resource blocks and below a maximum frequency of the one or more second allocated resource blocks.

13. The mobile device of claim 12, wherein the one or more processors are further configured to set parameters of an analog filter controlling emission of RF signal energy from the transmitter to be above the minimum frequency of the one or more first allocated resource blocks and below the maximum frequency of the one or more second allocated resource blocks to thereby limit concurrent transmission of the one or more first resource blocks and second resource blocks to frequencies above a minimum frequency of the one or more first allocated resource blocks and below a maximum frequency of the one or more second allocated resource blocks further comprises.

14. The mobile device of claim 12, wherein the one or more processors are further configured to decode a PDCCH symbol received in a downlink signal to determine an allocation of resource blocks in the first and second carriers of the uplink signal.

15. The mobile device of claim 12, wherein the RF receiving function comprises processing received satellite positioning system (SPS) signals, processing received Bluetooth® signals or processing received WiFi signals, or a combination thereof.

16. The mobile device of claim 12, wherein the one or more processors are further configured to determine that concurrent transmission in the first carrier and the second carrier likely interferes with the RF receiving function based, at least in part, on application of local oscillator frequencies for transmission in the first and second carriers to a look up table.

17. The mobile device of claim 12, and wherein the one or more processors are further configured to reduce a transmission power in the first uplink communication channel in response to a determination of a contribution of transmission of the first allocated resource blocks to intermodulation distortion affecting the RF receiving function.

18. The mobile device of claim 17, and wherein the one or more processors are further configured to determine the contribution of transmission of the first allocated resource blocks to intermodulation distortion affecting the RF receiving function based, at least in part, on at least one subcarrier frequency of a local oscillator for transmission of the first uplink communication channel and at least one coefficient associated with the at least one subcarrier frequency.

19. The mobile device of claim 12, wherein the first uplink communication channel is operating in a frequency division duplexing mode, and wherein the one or more processors are further configured to reduce a transmission power in the first uplink communication channel in response to a determination that the first uplink channel is in or entering a discontinuous transmission (DTX) period of operation.

20. The mobile device of claim 12, wherein the first uplink communication channel is capable of operating in a frequency division duplexing mode, and wherein the one or more processors are further configured to reduce a transmission power in the first uplink communication channel in response to a determination that the first uplink channel is operating in a time division duplexing (TDD) mode.

21. The mobile device of claim 12, wherein the one or more processors are further configured to reduce a transmission power in the first uplink communication channel in response to a determination that the second uplink communication channel is transmitting control channel messages or other messages comprising critical content.

22. The mobile device of claim 12, wherein the one or more processors are further configured to initiate transmission of a messages through the transmitter indicating a lower CQI value for the uplink communication channel to initiate a change in a resource block allocation in the first uplink communication channel in response to the determination that concurrent transmission in the first carrier and the second carrier likely interferes with the radio frequency (RF) receiving function.

23. The mobile device of claim 12, wherein the transmitter comprises a first physical transmitter to transmit the first carrier in the first uplink communication channel and a second physical transmitter to transmit the second carrier in the second uplink communication channel, and wherein the one or more processors are further configured to, in response to the determination that concurrent transmission in the first carrier and the second carrier likely interferes with the radio frequency (RF) receiving function:
- determine remaining intermodulation distortion following tuning the first oscillator to the frequency within the one or more first allocated resource blocks and tuning the second oscillator to the frequency within the one or more second allocated resource blocks;
- select the first physical transmitter or the second physical transmitter based, at least in part, on a physical isolation of the first transmitter from a receiver supporting the RF receiving function and a physical isolation of the second transmitter from the receiver supporting the RF receiving function; and
- reduce transmission power on the selected physical transmitter.

24. The mobile device of claim 23, wherein the one or more processors are further configured to select the first physical transmitter or the second physical transmitter further based, at least in part, on signal power of spectral components of the remaining intermodulation distortion.

25. A mobile device, comprising:
- means for scheduling transmission of one or more first allocated resource blocks in a first carrier of a first uplink communication channel;
- means for scheduling transmission of one or more second allocated resource blocks in a second carrier of a second uplink communication channel, at least a portion of the one or more second allocated resource blocks to be transmitted concurrently with transmission of at least a portion of the one or more first allocated resource blocks;
- means, responsive to a determination that concurrent transmission in the first carrier and the second carrier likely interferes with a radio frequency (RF) receiving function, for:
  - tuning a first oscillator for transmission of the one or more first allocated resource blocks to a first frequency within the one or more first allocated resource blocks; and
  - tuning a second oscillator for transmission of the one or more second allocated resource blocks to a second frequency within the one or more second allocated resource blocks; and
- means for adjusting an uplink transmission bandwidth size and location to limit uplink transmissions, from the mobile device, to frequencies above a minimum frequency of the one or more first allocated resource blocks and below a maximum frequency of the one or more second allocated resource blocks.

26. A non-transitory storage medium comprising computer readable instructions stored thereon which are executable by one or more processors of a mobile device to:
- schedule transmission of one or more first allocated resource blocks in a first carrier of a first uplink communication channel;
- schedule transmission of one or more second allocated resource blocks in a second carrier of a second uplink communication channel, at least a portion of the one or more second allocated resource blocks to be transmitted concurrently with transmission of at least a portion of the one or more first allocated resource blocks;
- in response to a determination that concurrent transmission in the first carrier and the second carrier likely interferes with a radio frequency (RF) receiving function:
- tune a first oscillator for transmission of the one or more first allocated resource blocks to a first frequency within the one or more first allocated resource blocks; and
- tune a second oscillator for transmission of the one or more second allocated resource blocks to a second frequency within the one or more second allocated resource blocks; and
- adjust an uplink transmission bandwidth size and location to limit uplink transmissions, from the mobile device, to frequencies above a minimum frequency of the one or more first allocated resource blocks and below a maximum frequency of the one or more second allocated resource blocks.

\* \* \* \* \*